United States Patent [19]
Wong et al.

[11] Patent Number: 5,682,413
[45] Date of Patent: Oct. 28, 1997

[54] ROTATIONAL ANGIOGRAPHY DYE AND MASK IMAGE ACQUISITION AND SYNCHRONIZATION

[75] Inventors: Hung Y. Wong, Solon; Robert J. Vagi, Broadview Hts., both of Ohio

[73] Assignee: Picker International, Inc., Highland Heights, Ohio

[21] Appl. No.: 667,406

[22] Filed: Jun. 21, 1996

[51] Int. Cl.⁶ .................................................. H05G 1/64
[52] U.S. Cl. ................................ 378/98.11; 378/98.12; 378/146
[58] Field of Search ........................... 378/98.11, 98.12, 378/4, 146, 11, 15, 21, 25, 98.2

[56] References Cited

U.S. PATENT DOCUMENTS

| | | | |
|---|---|---|---|
| 4,896,211 | 1/1990 | Hunt et al. | 358/101 |
| 4,922,337 | 5/1990 | Hunt et al. | 358/101 |
| 4,949,172 | 8/1990 | Hunt et al. | 358/101 |
| 5,040,057 | 8/1991 | Gilblom et al. | 358/101 |
| 5,301,220 | 4/1994 | Wong | 348/162 |
| 5,386,452 | 1/1995 | Toki | 378/146 |

*Primary Examiner*—Don Wong
*Attorney, Agent, or Firm*—Fay, Sharpe, Beall, Fagan, Minnich & McKee

[57] ABSTRACT

A patient is positioned on a patient support (12) and a gantry (16) carrying an x-ray source (10) and a radiation detector assembly (14) are rotated around the subject. The detector assembly includes a video camera (28) which is run in a synchronous mode to generate a first plurality of images at regular temporal intervals $T_{blanking}$. Because each image requires a finite time for generation, it is acquired over an interval of arc between a starting angular orientation ($A_S°$, $B_S°$) and a terminal angular orientation ($A_T°$, $B_T°$). A position encoder (40) monitors the terminal positions of each of the first series of images. The patient is then injected with a radiographic dye and the gantry is rotated in a reverse direction. A comparator compares the stored terminal angular positions of each forward direction image and the current angular position of the gantry. A trigger circuit (54) triggers an asynchronous mode x-ray exposure controller (50) such that a video image is commenced at each terminal angular orientation. Images generated over substantially the same arc segment are subtracted (66) to form a difference image for storage in a difference image memory (68) and display on a monitor (72).

12 Claims, 2 Drawing Sheets

ROTATIONAL ANGIOGRAPHY DYE AND MASK IMAGE ACQUISITION AND SYNCHRONIZATION

BACKGROUND OF THE INVENTION

The present invention relates to the art of angiographic examinations. It finds particular application in conjunction with angiographic examinations in which an x-ray source and a detector rotate around the subject and will be described with particular reference thereto. However, it is to be appreciated that the present invention will find application in other angiographic examinations and other examinations involving radiopaque dye.

Heretofore, digital x-ray systems have been used for angiographic examinations. An x-ray source was disposed on a rotatable gantry on one side of the subject and an x-ray detector disposed on the other side. The x-ray detector converted x-rays which had passed through the subject into visible light which was converted to a digital video signal. Because blood is relatively transparent to x-rays, the subject was injected with a radiopaque dye which had relatively good x-ray absorption such that blood vessels showed up dark in the resultant image. Images of only the circulatory system were made by subtracting a reference or basis image taken before injection of the dye from the image taken after injection of the dye.

Applications of x-ray angiography include imaging blood flow in a patient's head, neck, or other extremities, and the like. The radiopaque dye is introduced into an artery and flows with the blood into the patient's brain. In a normal healthy patient with good circulation, the dye appears in resultant images with a consistent intensity. However, in a patient with arterial blockage, typical candidates for such a procedure, the radiopaque dye suddenly stops along a particular path or fades signifying a partial blockage. If the patient is bleeding internally, the dye will appear to disperse in random directions.

In the prior systems, the x-ray source/detector started at an angular position relative to the subject and rotated through each of a plurality of locations at angular intervals along an arcuate path. Along the path, the x-ray source was activated at each location exposing the subject with x-rays for a short duration. The detector included a phosphor which was illuminated by the received radiation, a lens system which focused the image projected by the illuminated phosphor, and a video camera pickup to record the focused image. The images generated without the radiopaque dye injected into the subject were used as reference or mask images.

Once the x-ray source reached the end of the rotation, the x-ray source and detector were manually returned to the initial starting position, and the subject was injected with the radiopaque dye. The x-ray source and detector were again rotated along the arcuate path. The x-ray source was activated, as precisely as possible, at each of the same locations. During this second rotation, the second set of images generated contained a darkened vascular system caused by the radiopaque dye. The second images were then digitally subtracted from the mask images resulting in images of only the vascular system.

One disadvantage of the prior systems is that the mask images and the dye images did not align. During the second rotation, the x-ray source was activated at positions estimated to be the initial activation positions of the first rotation.

A second disadvantage is that a high exposure rate and a high image acquisition rate were used to minimize misalignment of the dye and the mask images. The high exposure rate is undesirable to the patient. The high image acquisition rate produces a great number of frames. Time-consuming human labor is then required to select and paired-up dye and mask images. Also, using the same forward and reverse rotation speed needed sophisticated rotation speed controls. Human intervention in realigning the gantry to the initial starting point also requires additional operator time which slowed the procedure.

The present invention provides a new and improved imaging method and system which overcomes the above problems and others.

SUMMARY OF THE INVENTION

In accordance with the present invention, an angiographic system is provided in which the diagnostic imaging equipment is rotated along an arcuate path in a forward direction around a subject. The subject is exposed to x-rays at a plurality of positions over the arcuate path. At each exposure, an image is generated indicative of the x-rays received by a detector. At the end of the path, the subject is injected with a radiopaque dye. The diagnostic imaging equipment is rotated in a reverse direction along the arcuate path and automatically exposes the subject to x-rays which generate second images which align with the first images. Each corresponding first and second image is subtracted, resulting in images showing only portions of the subject carrying the radiopaque dye.

In accordance with a more specific aspect of the present invention, an x-ray source and oppositely mounted detector assembly including a video are continuously rotated in a first direction around the subject in an arcuate path. During rotation, the x-ray source is exposed in synchronization with the camera vertical drive to generate images at regular intervals. For each image, there is a start position along the arcuate path and a terminal position. Each terminal position is stored. In the reverse rotation, the x-ray source is exposed at each of the stored terminal positions, which is asynchronous with the camera vertical drive. The video camera is blanked before each exposure start, and is unblanked after each exposure to read out the acquired image. The video camera is then blanked again to wait for the next exposure start. A corresponding set of second images is produced which align with the first images generated at the same positions. The corresponding first and second images are subtracted from each other, producing a resultant image showing only the selected veins or arteries which carry the radiopaque dye. The resultant images are then displayed in a human-readable form.

One advantage of the present invention is that the automatic synchronization of the forward and reverse directions of the x-ray exposures reduces human intervention and the procedure is completed in less time.

Another advantage of the present invention is that a lower exposure rate and dosage to the patient is used due to the automatic alignment. The automatic alignment also increases image resolution of the resultant subtracted image.

Another advantage of the present invention is that the stored terminal positions allow for the reverse rotation of the gantry to be at any speed relative to the forward speed rotation. Synchronization of forward and reverse speeds are not required thus resulting in simpler rotation speed control.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
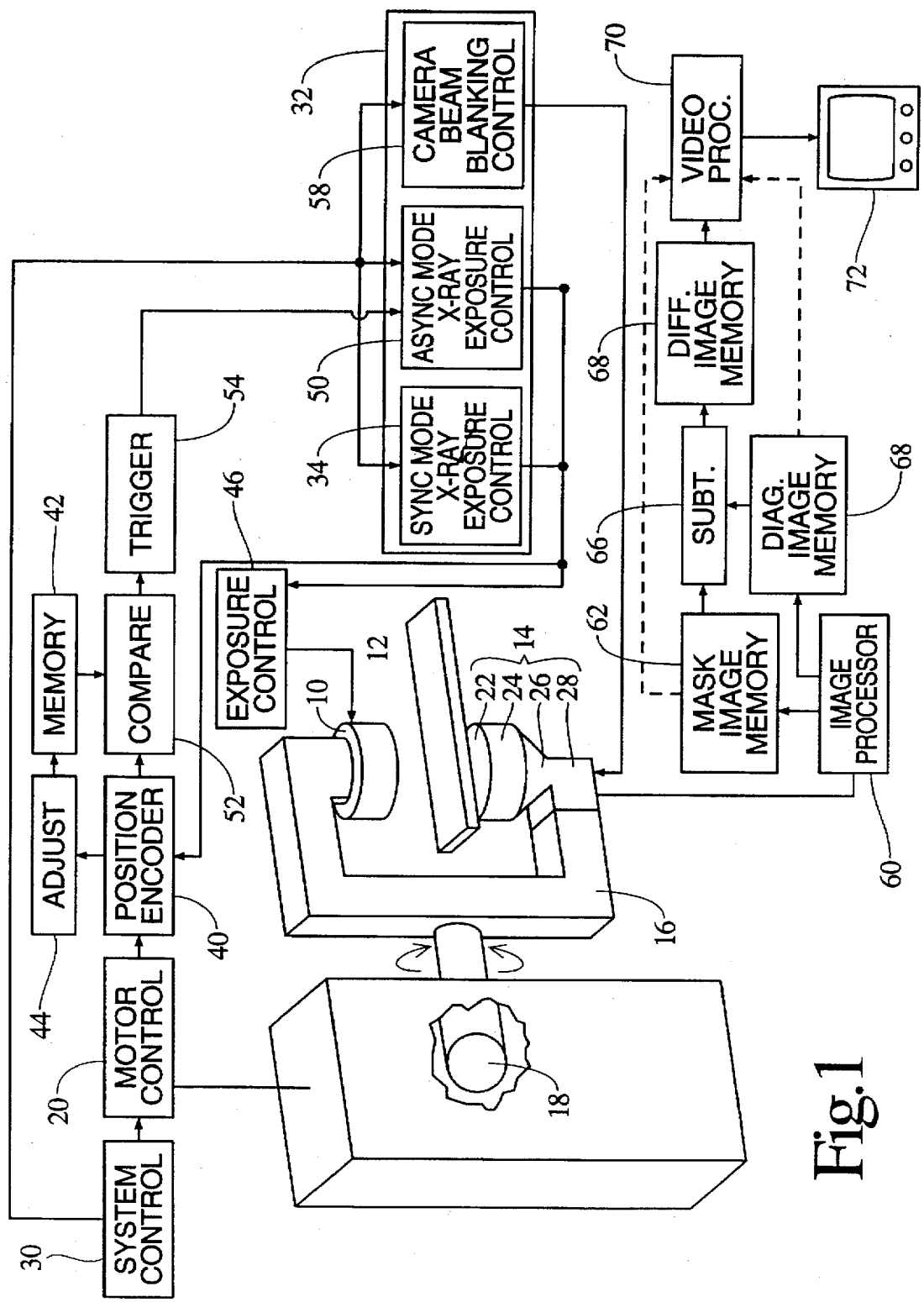
FIG. 1 is a diagrammatic illustration of a digital angiographic system in accordance with the present invention; and, FIG. 2 illustrates timing diagrams in accordance with the present invention.

An x-ray source 10 such as an x-ray tube selectively passes a beam of radiation through a subject supported on a couch or support 12 to an x-ray detector assembly 14. The x-ray tube is controlled electronically to stop and start the generation of x-rays.

The x-ray source and x-ray detector combination are mounted on a gantry 16 for rotational movement around the subject which is supported on the patient support 12. In the preferred embodiment, a motor 18, which is controlled by a motor control 20, continuously rotates the gantry 16 at a selected rate.

The radiation detector assembly 14 includes a phosphor plate or sheet 22 disposed behind an optically opaque but radiation transparent shield. The phosphor converts received radiation into a relatively faint optical image. Preferably, the phosphor is part of an image intensifier 24 that boosts the intensity of the optical image. A lens system 26 focuses the intensified optical image onto the image pick-up surface of a video camera 28. Preferably, the camera 28 is a video camera that produces video signals. The video camera can be put into a blank mode by a video camera beam blanking control 58. In beam blank mode, the camera is held at ready to acquire images and starts to produce images in response to an external beam un-blank signal. Alternately, other opto-electrical converters can be utilized to convert the optical image into an electronic image representation.

In the preferred embodiment, reference images are collected at a plurality of positions during a forward sweep of the x-ray source 10 around the subject. A system controller 30 in conjunction with the motor controller 20, continually rotates the x-ray source/detector along an arcuate path. Preferably, the path is about 90° to 180°. Of course, other rotation path distances can be selected. For example, the x-ray source can start adjacent one ear of the patient and the detector assembly adjacent the other. The x-ray source and detector rotate about the axis of the patient until each is adjacent the other ear. The x-ray source/detector is preferably rotated at a rate of about 20°/second. Of course, other speeds can be selected. The system controller 30 further causes a timing and control circuit 32 to select the synchronous mode.

Figure 2:
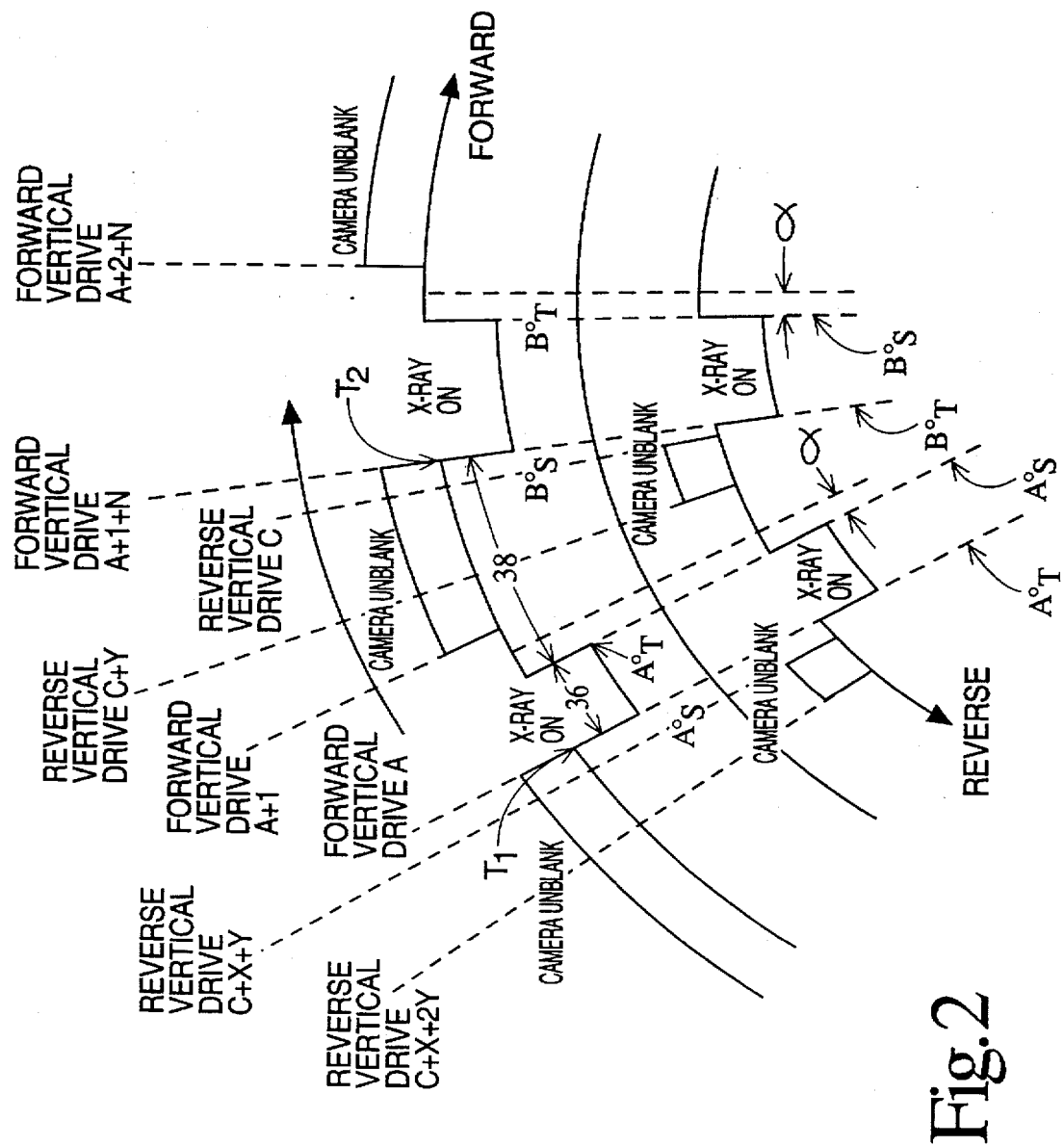

With continuing reference to FIG. 1 and further reference to FIG. 2, a synchronous mode x-ray exposure controller 34 starts x-ray in synchronous with respect to the camera vertical drive. At the same time, the camera beam blanking controller 58 sets the camera into blank mode to acquire the image of current exposure. At the termination of an x-ray exposure, the camera beam blanking controller 58 unblanks the camera at the camera vertical drive to collect frame data of the exposure just completed. In the diagram of FIG. 2, the x-ray exposure starts at a time $T_1$ at an exposure start gantry angle $A_S°$. A light image is then received on its CCD array, camera tube, or the like, for a time duration 36. Thereafter, x-rays are turned off until a next image is commenced at time $T_2$ at gantry angle $B_S°$. In the time interval 38 in between, the camera reads out the accumulated image data and converts it into an appropriate video signal.

A position or angular orientation determining device 40, such as an optical encoder, a linear rheostat, or the like, is enabled and reads the current angular position of the gantry at the terminal end of each exposure, i.e , angles $A_T°$, $B_T°$ etc. The synchronized mode control 34 communicates with the position device 40 to determine the terminal end of each exposure. Typically, many exposures are made per scan. The exposure gantry angles $A_T°$, $B_T°$, etc. as denoted in FIG. 2, are recorded in a position memory 42 as terminal angular positions. More specifically, a gantry angle adjustment circuit 44 adds an angular adjustment $\alpha$ to the actually measured gantry exposure termination angles to compensate for inherent system errors. Because the synchronized mode control 34 commences each image at precisely fixed time intervals, the recorded gantry angles will be at regular angular intervals, if the rotation of the x-ray source and detector is precisely uniform. However, because the gantry angles are recorded, variations in the speed of gantry rotation are permitted.

The x-ray source 10 can be operated in a continuous mode. However, because the inter-image time period 38 is so much larger than the imaging time period 36, the x-ray tube is gated ON and OFF by the exposure controller 46 in synchronous with the camera vertical drive for each image. The x-ray tube triggering signal can precede the time $T_1$ by an appropriate duration for the x-ray tube, to reach a stable, steady-state operating intensity.

After the last reference image is generated, the radiopaque dye is released into the subject. In the preferred embodiment, the dye is automatically released by a pressure injector under control of the system controller 30. Alternately, trained medical personnel release the radiopaque dye into a catheter that has been previously positioned in the appropriate artery.

The system control 30 then causes the motor control 20 to commence rotating the gantry in the opposite direction, preferably at substantially the same speed that the gantry was rotated in the forward direction. The system control enables an asynchronous mode control portion 50 of the timing and control circuit 32. In the asynchronous mode, the video camera is blanked by the camera beam blanking controller 58, and is ready to acquire images. The angular offset $\alpha$ imposed by the angle adjustment circuit 44 is calculated such that the x-ray exposure starts precisely at the angular position that the corresponding forward direction x-ray exposure was completed such as at $A_T°$ and $B_T°$.

A comparator 52 compares the current position of the gantry with the positions stored in the position memory 42. Each time the gantry moving in the reverse direction reaches one of the stored angular positions, a trigger circuit 54 causes the asynchronous mode x-ray exposure controller 50 to initiate an x-ray exposure. At the termination of each exposure, the acquired image is read out from the video camera at the start of the next vertical drive.

As each frame of the frame or video image is generated in the forward direction, the output of the video camera 28 is forwarded to an image processor 60 and stored in a mask or forward direction image memory 62 along with the corresponding angular position. Analogously, each frame or video image in the reverse direction is forwarded to the image processor 60 and stored in a dye enhanced image memory 64 along with the corresponding angular orientation of each. An image subtraction circuit 66 subtractively combines corresponding mask and dye enhanced images to generate difference or dye only images that are stored in a difference image memory 68 in conjunction with each angular orientation. The operator selects the angles of the difference images to be viewed and a video processor 70 converts them to an appropriate format for display on a human-readable display device 72 such as a video monitor, active matrix display, or the like. Alternately, other types of image processing may be performed. For example, individual mask images alone may be displayed, individual dye enhanced images may be displayed, a plurality of mask or dye enhanced images can be arranged side-by-side or in rows and columns in a common display, or the like. As yet another example, the data may be reconstructed into a three-dimensional image using CT reconstruction algorithms.

In an alternative embodiment, the radiopaque dye is released into the subject before the forward sweep. The dye images are then generated along the forward arcuate path. Once the x-ray source 10 reaches the end of the path, the scanning process is paused a sufficient time to allow the radiopaque dye to dissipate. Once sufficient time has elapsed, the x-ray source 10 is rotated in the reverse direction and automatically triggered at each of the terminal positions of the exposures taken during the forward sweep. The reference images generated during the reverse sweep are then subtracted from the dye enhanced images of the forward sweep. The resulting images then show only the arteries and/or veins which carry the radiopaque dye. The automatic activation of the x-ray source 10 during the reverse sweep at each of the stored terminal positions of the forward sweep produces images which align with the images generated during the forward sweep.

Preferably, the video processor 70 converts the difference image received in the difference image memory 68 into appropriate format for display on the monitor 72. Sufficient computational power is provided in the image processor 60, image subtraction processor 66, and the video processor 70 that the images are displayed on the monitor 72 substantially in real time. Alternately, rather than displaying the difference image, the diagnostic images can be conveyed directly to the video processor for display. Generally, the radiopaque dye is sufficiently distinctive that its progress through the blood vessels is readily apparent, even when the surrounding tissue and bones are displayed concurrently in other shades of gray or artificially enhanced colors.

In the preferred embodiment, a plurality of scan programs can be selected or the scan program can be custom generated. An operator selection or controller, such as a keyboard or a mouse (not shown), is used to select one of a plurality of previously selected scan routines from a scan program memory (not shown). The operator control can also be used to select exposure times, rotation rate, and frame rates for each of the positions.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of acquiring images in an x-ray diagnostic imaging system including an x-ray source and an oppositely mounted detector with a subject receiving region therebetween, the method comprising:

rotating the x-ray source and the detector in a first direction around a subject within the subject receiving region from a start position to an end position;

projecting x-rays across the subject receiving region;

during the rotating in the first direction, converting x-rays received during each of a plurality of imaging intervals into first direction electronic images, each first direction electronic image being generated over predetermined duration and being identified by a lead angular position and a terminal angular position around the patient;

rotating the x-ray source and the detector, after reaching the end position, in a second direction reverse to the first direction from the end position to the start position;

projecting x-rays across the subject receiving region;

at each of the terminal angular positions, commencing generation of a second direction electronic image, such that first and second direction electronic images are generated corresponding to each of a plurality of terminal angular positions; and, subtracting corresponding first and second direction electronic images to generate a set of electronic difference images.

2. The method of acquiring images as set forth in claim 1 further including: prior to rotating in one of the first and second directions, injecting the subject with an x-ray opaque dye.

3. The method of acquiring images as set forth in claim 2 further including:

adjusting each of the terminal angular positions to compensate for system error; and storing each of the adjusted terminal angular positions corresponding to each first direction electronic image during the rotating in the first direction.

4. The method of acquiring images as set forth in claim 1 wherein the predetermined duration of each electronic image is less than 15 milliseconds.

5. The method of acquiring images as set forth in claim 1 wherein the rotating in the first and second directions is continuous.

6. The method of acquiring images as set forth in claim 1 wherein electronic images are produced in the first direction by the generation of x-rays operating in synchronous with a camera vertical drive and electronic images are produced in the second direction by the generation of x-rays operating in synchronous with gantry positions in which the x-rays are activated at each of the adjusted terminal positions and deactivated at each of the lead positions of the first direction.

7. The method of acquiring images as set forth in claim 6 whereby, the video camera is blanked during an x-ray exposure and triggered by the camera vertical drive to commence images read off at the termination of the x-ray exposure.

8. The method of acquiring images as set forth in claim 1 wherein the start position to the end position define an arcuate path having less than 180°.

9. A method of x-ray angiographic imaging comprising:

rotating a radiation source in a forward direction along an arcuate path around a subject and generating a first plurality of regular temporal images;

measuring, adjusting, and storing indications of angular positions around the subject at which generation of each of the first images terminates;

rotating the radiation source in a reverse direction along the arcuate path and generating a second plurality of images, generation of each of the images commencing at the adjusted angular position at which one of the first plurality of images terminated;

prior to rotating the radiation source in one of the forward and reverse directions, injecting a radiopaque dye into the subject;

subtracting corresponding images from the first and second pluralities of images generated at corresponding positions to generate a plurality of subtracted images; and, displaying the subtracted images in a human-readable form.

10. A method of acquiring images in a rotational angiography system comprising:

projecting x-rays towards a subject from a plurality of positions along an arcuate path while rotating around a subject in a forward direction, and generating a first image over each of the plurality of arc segments;

projecting x-rays towards the subject from the plurality of positions along the arcuate path while rotating around the subject in a reverse direction and generating a second image over each of the plurality of arc segments; and, injecting an x-ray opaque dye into the subject before rotating in one of the forward and reverse directions.

11. A rotational x-ray angiography system comprising:

an x-ray source mounted on a rotatable gantry;

an x-ray detector assembly oppositely mounted from the x-ray source on the gantry with a subject receiving region defined therebetween, the x-ray detector being actuated to convert received radiation into electronic images;

a motor for rotating the gantry around the subject receiving region in an arcuate path in a forward direction and in a reverse direction such that during each image generation interval the x-ray source and the x-ray detector assembly move over an arc segment between an initial angular orientation and a terminal angular orientation;

an angular position encoder for determining angular orientations of the x-ray detector during rotation in the forward and reverse directions;

a first mode control circuit for controlling the x-ray detector assembly to generate a series of forward direction images at temporally regular intervals and for accessing the angular position encoder for determining the angular orientations at which each of the series of forward direction images terminates;

an adjustment means for adjusting the forward direction image termination angular orientations to compensate for system error;

a memory for storing indications of the adjusted forward direction image termination angular orientations;

a comparator connected with the angular position encoder and the memory to compare angular positions during rotation in the reverse direction with the stored terminal angular orientations;

a trigger circuit connected with the comparator and a second mode control circuit to trigger the x-ray detector assembly to generate one of the reverse direction images overlapping an arc segment over which one of the forward direction images was generated;

an image subtractor for subtracting the forward and reverse direction images generated over corresponding arc segments to generate a series of difference images; and, an image display for displaying the difference images in a human-readable form.

12. The rotational x-ray angiography system as set forth in claim 11 wherein the x-ray detector assembly includes:

a phosphor for converting received x-rays into a light image;

a video pick-up for converting the light image into an electronic image signal.

* * * * *